United States Patent [19]

Ohki et al.

[11] Patent Number: 5,381,185
[45] Date of Patent: Jan. 10, 1995

[54] METHOD AND APPARATUS FOR CORRECTING FLESH COLOR

[75] Inventors: Hideaki Ohki, Fujisawa; Masanori Kamiya, Yokohama, both of Japan

[73] Assignees: Hitachi, Ltd., Tokyo; Hitachi Video and Information, Kanagawa, both of Japan

[21] Appl. No.: 94,335

[22] Filed: Jul. 20, 1993

[30] Foreign Application Priority Data

Jul. 20, 1992 [JP] Japan ................... 4-191885

[51] Int. Cl.$^6$ .............................. H04N 9/64
[52] U.S. Cl. ............................ 348/652; 348/649
[58] Field of Search ............. 348/652, 653, 649; H04N 9/64

[56] References Cited

U.S. PATENT DOCUMENTS

| | | | |
|---|---|---|---|
| 3,740,459 | 6/1973 | Okada | 358/28 |
| 3,749,825 | 7/1973 | Moore | 358/28 |
| 3,950,779 | 4/1976 | Suenaga | 358/28 |
| 4,051,510 | 9/1977 | Cochran | 358/28 |
| 4,219,840 | 8/1980 | Srivastava | 358/28 |
| 4,327,374 | 4/1982 | Matsuda et al. | 358/28 |
| 4,754,321 | 6/1988 | Srivastava | 358/28 |
| 5,134,465 | 7/1992 | Ohki et al. | 358/27 |

FOREIGN PATENT DOCUMENTS 42691 2/1987 Japan ................... H04N 9/64

OTHER PUBLICATIONS

Sanyo Semiconductor Technical Data, "LA7698 Block Diagram," Issued from Semiconductor Division of Sanyo Electric Co., Oct. 1990.
Data Book of Hitachi ICS for consumer products, video IC Edition, "HA11511CNT", published by Semiconductor Division of Hitachi, Ltd., Sep. 1987 (First Edition), Sep. 1991 (Third Edition).

Primary Examiner—James J. Groody
Assistant Examiner—Glenton B. Burgess
Attorney, Agent, or Firm—Antonelli, Terry, Stout & Kraus

[57] ABSTRACT

In a method for correcting flesh color including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, the R-Y color-difference signal level is detected, and correction of the B-Y color-difference signal by the flesh color correction signal is inhibited, when the detected R-Y color-difference signal level is higher than a predetermined value.

11 Claims, 5 Drawing Sheets

METHOD AND APPARATUS FOR CORRECTING FLESH COLOR

BACKGROUND OF THE INVENTION

The present invention relates to a method for correcting flesh color by automatically making corrective changes in the flesh or skin color tone on a television receiver and to an apparatus for correcting flesh color using the above-mentioned method.

As a conventional flesh color correcting apparatus, as indicated in Japanese Patent Application Laid-Open No. 62-42691, an automatic hue correction apparatus for correcting a certain range of colors on a predetermined demodulation axis as flesh color correction is proposed. Next, the above automatic hue correction apparatus will be explained with reference to FIG. 9.

Assuming that R-Y, G-Y, and B-Y color-difference signals output from a demodulator 201 shown in FIG. 9 are SR, SG, and SB, SR and SB are supplied to the first combiner and second combiner, and the first combiner outputs a Q signal, and the second combiner outputs an I signal, Q+Q1 signal, and Q−Q1 signal. The I signal, Q+Q1 signal, and Q−Q1 signal are supplied to a first controller 207 and a second controller 208 together with a Vref (reference) signal at a terminal 7 so as to control a switch 211 mounted between a hue adjuster 204 and an averaging circuit 210. The Q signal is amplified by an amplifier 209, supplied to the averaging circuit 210 as an adjusting signal, and smoothed and supplied to the hue adjuster 204 as an averaged adjusting signal.

Phase shifters 202 and 203 are synchronized with a burst signal and output continuous waves (reference carrier waves for demodulation) which are controlled by the hue adjuster 204. The demodulator 201 receives the waves and outputs the demodulated color-difference signals R-Y, G-Y, and B-Y. When the demodulated signals are within the correction range which is set by the Vref signal, the switch 211 is closed, and the averaged adjusting signal is supplied to the hue adjuster 204, and the phases of the continuous waves are changed, and the colors within the correction range are corrected to desired colors.

Since the above prior art detects and corrects only the flesh color hue, the hues neighboring the flesh color hue are shifted in color reproduction in the I-axis direction. Therefore, for example, magenta, red, and yellow are changed to pink, reddish-orange, and yellowish-orange, respectively, and the color reproducibility is degraded.

SUMMARY OF THE INVENTION

An object of the present invention is to eliminate the difficulties of the prior art that are mentioned above, and to provide a method for correcting flesh color on a television receiver which can reduce the degradation of reproduction of other colors neighboring to the flesh color and an apparatus for correcting flesh color using the corresponding method.

To accomplish the above object, according to an example of the method for correcting flesh color of the present invention, to distinguish the flesh color from other colors, the color signal level is detected and the flesh color is distinguished from the other colors according to the detected result.

According to another example of the method for correcting flesh color of the present invention, to distinguish the flesh color from other colors, the luminance signal level is detected and the flesh color is distinguished from the other colors according to the detected result.

An embodiment of the apparatus for correcting flesh color of the present invention has a detector for detecting the color signal level and a gain controller for controlling the gain of a flesh color correcting signal by this output.

Another embodiment of the apparatus for correcting flesh color of the present invention has a detector for detecting the luminance signal level and a gain controller for controlling the gain of a flesh color correcting signal by this output.

Since the color signal level representing the flesh color (for example, the flesh color level in a color subcarrier signal, or R-Y color-difference signal, or −(B-Y) color-difference signal) is generally lower than that of magenta, red, or yellow, the flesh color can be distinguished from magenta, red, and yellow by the detected result of this color signal level. Therefore, when the flesh color is detected, the flesh color correcting operation is performed and when other colors are detected, the flesh color correcting operation can be inhibited. As a result, the flesh color can be corrected without the reproduction of magenta, red, and yellow being degraded.

Since the luminance signal level of the image part a flesh color is generally higher than that of magenta or red, the flesh color can be distinguished from magenta and red by the detected result of this luminance signal level. Therefore, when the flesh color is detected, the flesh color correcting operation is performed and when magenta or red is detected, the flesh color correcting operation can be inhibited. As a result, the flesh color can be corrected without the reproduction of magenta and red being degraded.

DETAILED DESCRIPTION OF PREFERRED EMBODIMENTS

Next, the embodiments of the present invention will be explained with reference to the accompanying drawings.

Figure 1:
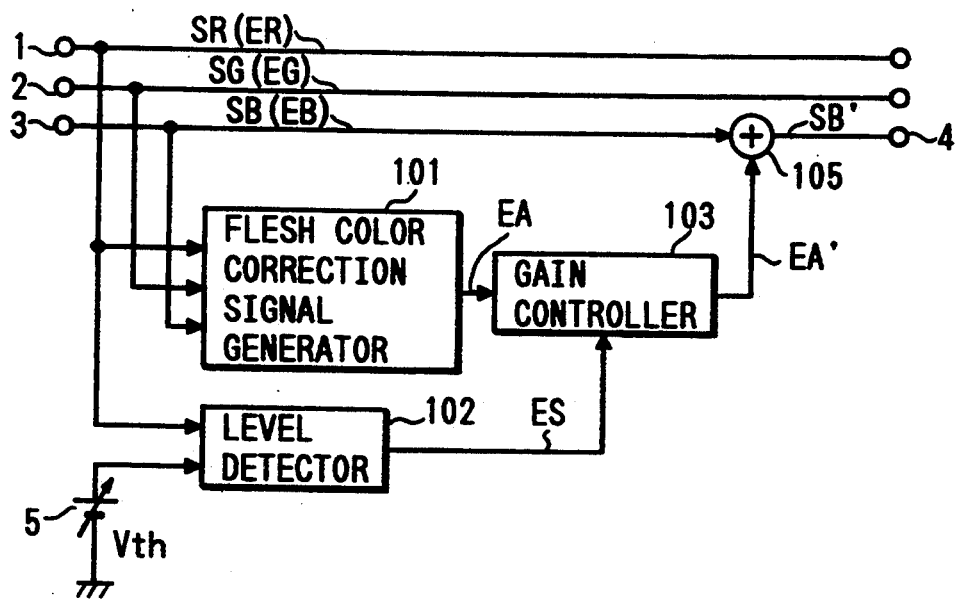
FIG. 1 is a block diagram showing an apparatus for correcting flesh color of an embodiment of the present invention.

FIG. 1 is a block diagram showing an embodiment of the apparatus for correcting flesh color of the present invention. Reference numeral 101 indicates a flesh color correction signal generator, 102 a level detector, 103 a gain controller, and 105 an adder.

In FIG. 1, R-Y, G-Y, and B-Y color-difference signals SR, SG, and SB (their amplitude levels are ER, EG, and EB) are supplied to the flesh color correction signal generator 101 and a flesh color correction signal EA is output. This flesh color correction signal EA is supplied to the gain controller 103 and a flesh color correction signal EA' whose gain is controlled is output. This flesh color correction signal EA' is supplied to the adder 105 and an output signal SB' (the amplitude level is EB') in which the flesh color is corrected by adding SB of another input signal is obtained at a terminal 4. On the other hand, the signal SR and an optional predetermined voltage 5 (the voltage is Vth) are supplied to the level detector 102 and a comparison output signal is output as a level detection signal ES. The aforementioned gain controller 103 is controlled by this level-detection signal ES.

The flesh color correction signal generator 101 generates an I-axis component and Q-axis component of each color-difference signal from the R-Y, G-Y, and B-Y color-difference signals SR, SG, and SB and then generates the flesh color correction signal EA on the basis of the generated I-axis and Q-axis components.

The flesh color correction signal generator 101 and gain controller 103 constitute an integrated circuit. Such integrated circuits are on sale, for example, as Type LA7698 from Sanyo Electric Co., Japan.

Figure 8:
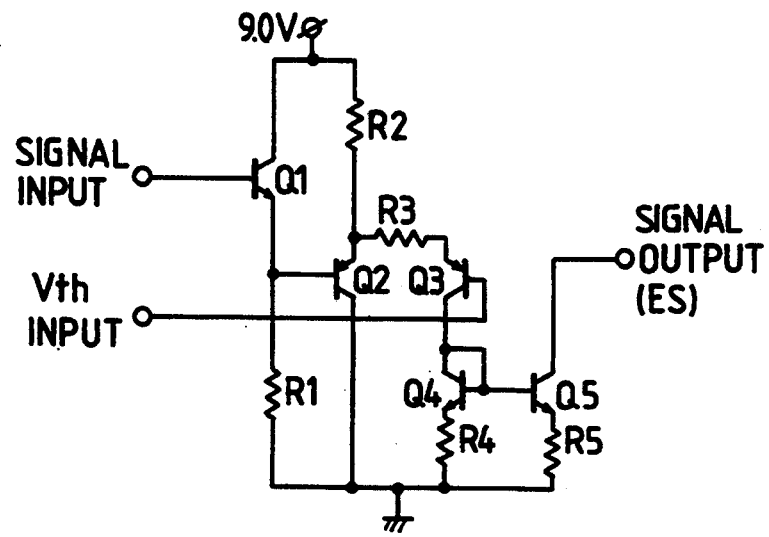
FIG. 8 is a circuit diagram of a signal level detector which is used in the apparatus for correcting flesh color of the embodiment of the present invention.
Figure 9:
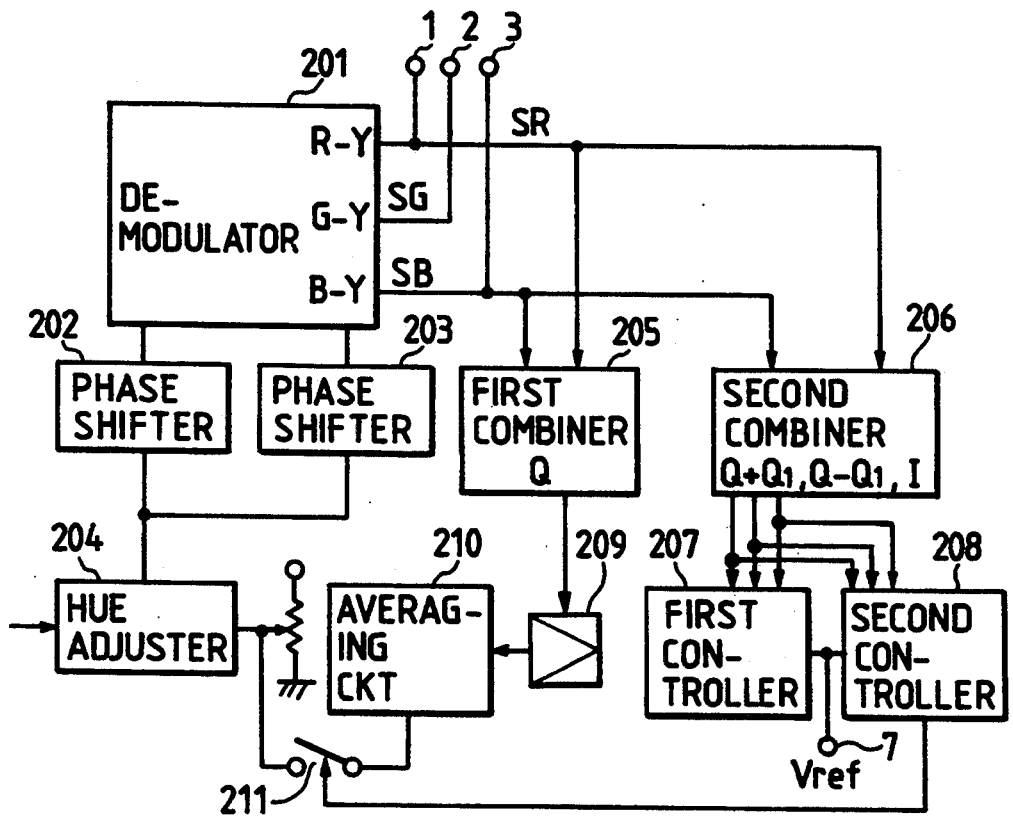
FIG. 9 is a block diagram showing an example of the conventional apparatus for correcting flesh color.

An example of the level detector 102 is shown in FIG. 8. When the level of an input signal exceeds a voltage of Vth in this circuit, the level of the output signal ES becomes 0. When the level is not higher than Vth, a fixed output signal ES is obtained. When a level of 0 is supplied to the gain control terminal of the gain controller 103, the gain of the gain controller 103 becomes 0 and hence the level of the correction signal EA becomes 0. When the level ER of the R-Y color difference signal SR which is supplied to the level detector 102 exceeds the voltage Vth like this, the flesh color correcting operation is inhibited.

Figure 2:
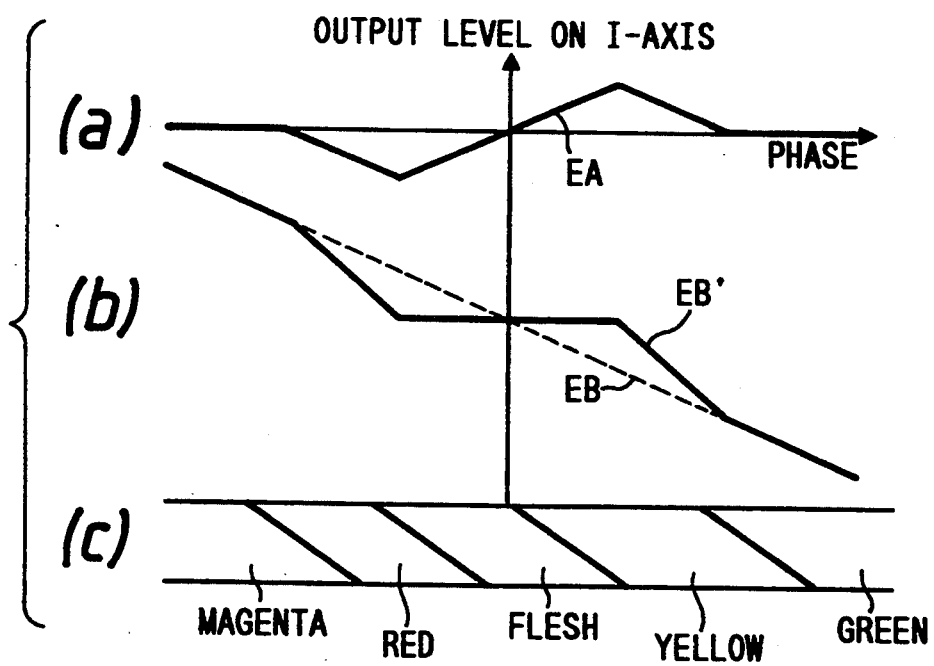
FIG. 2 is a waveform diagram for generally explaining the operation of the embodiment shown in FIG. 1.
Figure 3:
FIG. 3 is a waveform diagram for explaining the operation of the embodiment shown in FIG. 1 in two cases.

Detailed operations of this embodiment will be explained with reference to FIGS. 2 and 3. FIG. 2 is an illustration for the flesh color correcting operation and shows characteristics when the amplitude of a color signal is kept constant and the hue is changed. The hue (phase of color) is denoted in the horizontal axis and the signal level is denoted in the vertical axis. FIG. 2(a) shows characteristics of the flesh color correction signal EA. As shown in the drawing, the flesh color correction signal EA has an S-shaped characteristic whereby the output level of the signal becomes 0 at a phase of I-axis. FIG. 2(b) shows characteristics before (EB) and after (EB') correction of the B-Y color-difference signal. EB' is characterized by the addition of EB and EA. According to the EB' characteristic, within the phase range where the level is horizontal, the phase is not changed equivalently and it indicates that the hue neighboring to the I-axis is corrected to the hue of the I-axis. FIG. 2(c) shows the phase denoted in the horizontal axis in colors which are actually reproduced. The reason each boundary between two neighboring colors is oblique is that the color which is reproduced by the level of a luminance signal which is added lastly is changed. Namely, even in the case of a color-difference signal of the same phase, the reproduced color may be a flesh color or red. As shown in this drawing, when the flesh color is corrected, the neighboring colors are also changed.

Next, detailed operations will be explained with reference to FIG. 3. In FIG. 3, the time is denoted in the horizontal axis, and characteristics when various colors are input with time are shown. FIG. 3(a) shows input colors. FIG. 3(b) shows a characteristic of the flesh color correction signal EA. This characteristic can be obtained from the characteristic shown in FIG. 2(a). The signals shown by diagonal lines are correction signals other than flesh color, so that they are not originally necessary. FIG. 3(c) shows a characteristic of the R-Y color-difference signal (ER) which is supplied to the level detector 102 and the level Vth of the predetermined voltage 5. From this relationship, the red range can be specified. The output signal ES of the level detector 102 which is the result is shown in FIG. 3(d). When the gain of the gain controller 103 is controlled by this signal, the flesh color correcting operation within the red range is inhibited. Therefore, the correction signal EA' which is obtained as output of the gain controller 103 has the characteristic shown in FIG. 3(e). The correction signal which is unnecessary for red is removed accordingly, and the problem that the hue of red is changed is improved.

Next, the yellow hue variation improvement will be explained. For yellow, it is required to change the input signal of the level detector 102 from the R-Y color-difference signal (ER) to the B-Y color-difference signal (EB). Operation illustrations are shown in FIGS. 3(f) to 3(h). FIG. 3(f) shows a characteristic of the B-Y color-difference signal (EB) which is supplied to the level detector 102 and the level Vth of the predetermined voltage 5. From this relationship, the yellow range can be specified. The output signal ES of the level detector 102 which is the result is shown in FIG. 3(g). When the gain of the gain controller 103 is controlled by this signal, the flesh color correcting operation within the yellow range is inhibited. Therefore, the correction signal EA' which is obtained as output of the gain controller 103 has the characteristic shown in FIG. 3(h). The correction signal which is unnecessary for yellow is removed in the same way as red and the problem that the hue of yellow is changed is improved.

When a color signal which is to be compared is a signal to be controlled in gain and the signal amplitude is changed, the threshold level is changed relatively and the aforementioned characteristic cannot be obtained. By changing the level Vth of the predetermined voltage 5 in accordance with a change in the signal amplitude in this case, a most suitable correction characteristic can always be obtained.

Figure 4:
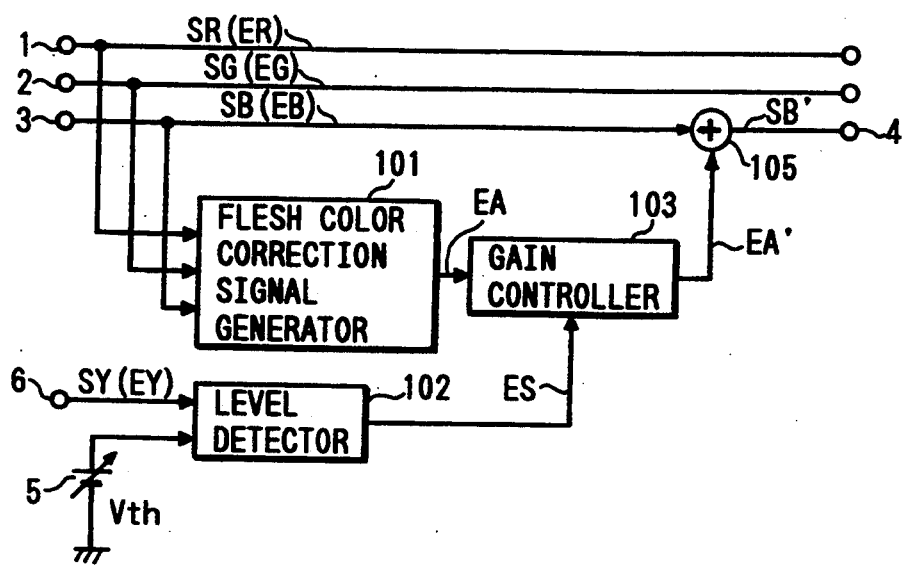
FIG. 4 is a block diagram showing an apparatus for correcting flesh color of another embodiment of the present invention.

FIG. 4 is a block diagram showing another embodiment of the apparatus for correcting flesh color of the present invention. For the parts shown in FIG. 4 which are the same as those shown in FIG. 1, the same reference numerals are assigned and detailed explanation thereof is omitted. A point of difference of FIG. 4 from FIG. 1 is that an input signal of the level detector is a luminance signal SY (the amplitude level is EY) which is supplied to a terminal 6.

Figure 5:
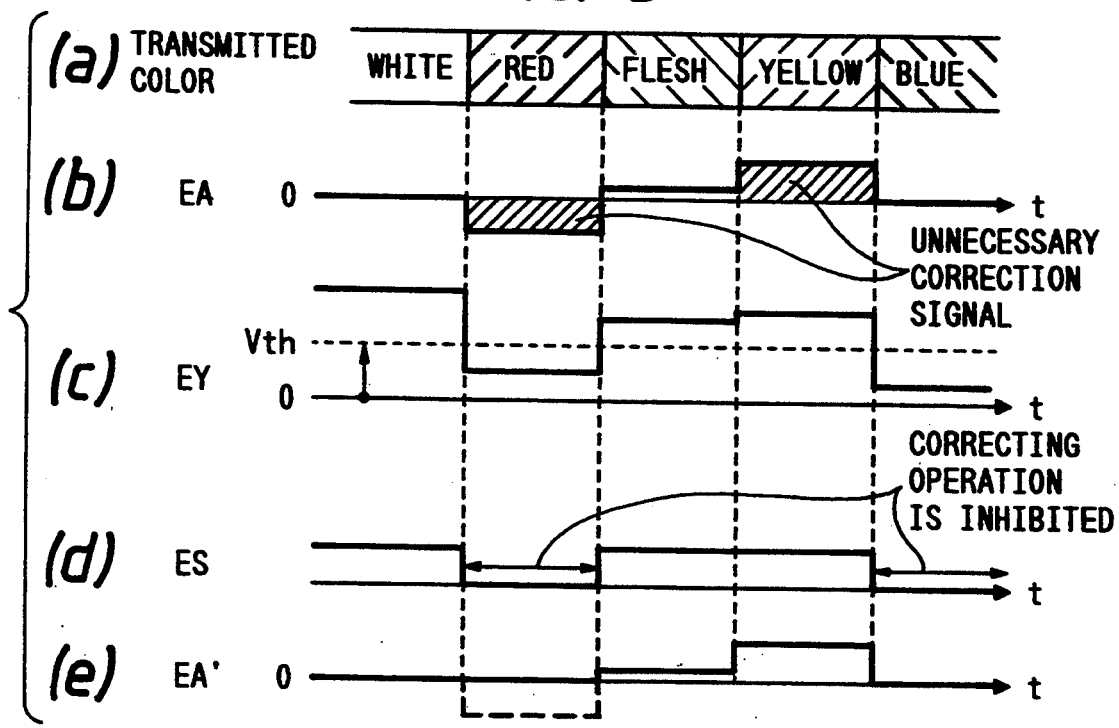
FIG. 5 is a waveform diagram for explaining the operation of the embodiment shown in FIG. 4.

Detailed operations of this embodiment will be explained with reference to FIG. 5. Since FIGS. 5(a) and 5(b) are the same as FIGS. 3(a) and 3(b), explanation will be omitted. FIG. 5(c) shows a characteristic of the luminance signal (EY) which is supplied to the level detector 102 and the level Vth of the predetermined voltage 5. From this relationship, the red and blue ranges can be specified. The output signal ES of the level detector 102 which is the result is shown in FIG. 5(d). When the gain of the gain controller 103 is controlled by this signal, the flesh color correcting operation within the red range is inhibited. Therefore, the correction signal EA' which is obtained as output of the gain controller 103 has the characteristic shown in FIG. 5(e). The correction signal which is unnecessary for red is removed like this and the problem that the hue of red is changed is improved. (Although the flesh color correcting operation within the blue range is also inhibited, no waveform change appears in EA' because no correction signal exists in EA.)

Figure 6:
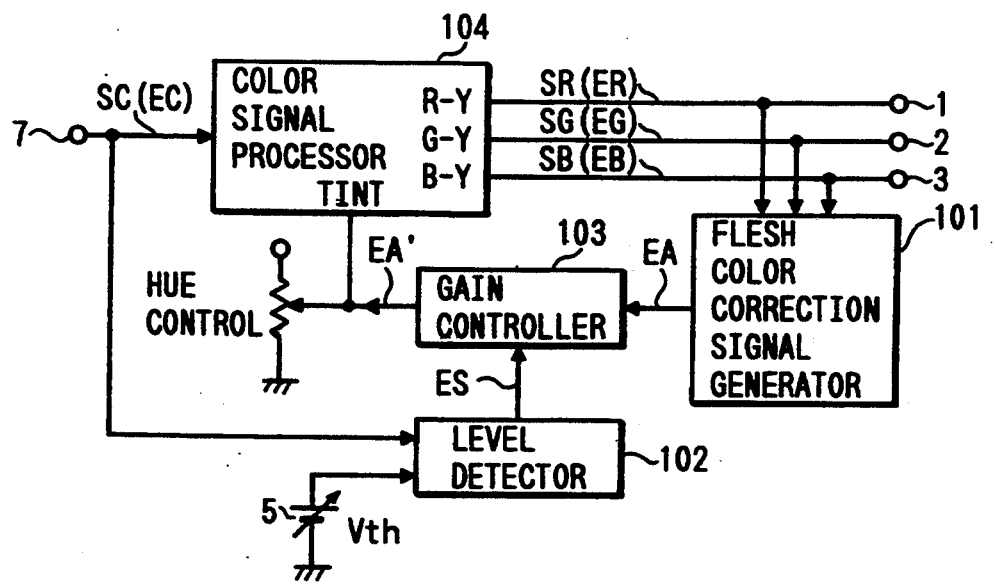
FIG. 6 is a block diagram showing an apparatus for correcting flesh color of a further embodiment of the present invention.

FIG. 6 is a block diagram showing another embodiment of the apparatus for correcting flesh color of the present invention. To the parts shown in FIG. 6 which are the same as those shown in FIG. 1, the same reference numerals are assigned and detailed explanation is omitted. Points of difference of FIG. 6 from FIG. 1 are that in this embodiment, a color sub-carrier signal is subjected to level detection and flesh color correction control is hue control (tint control) of the color demodulator. Next, the configuration will be explained. A color sub-carrier signal SC (the amplitude level is EC) which is supplied to a terminal 7 is supplied to a color signal processor 104 including the color demodulator and the level detector 102. The flesh color correction signal EA' whose gain is controlled is supplied to the tint control terminal of the color signal processor.

The color signal processor 104 includes an R-Y demodulator, B-Y demodulator, a variable phase shifter for adjusting the phase of a reference carrier wave for demodulation, and a matrix circuit.

In the color signal processor 104, the color sub-carrier signal is demodulated, and R-Y and B-Y color-difference signals are obtained, and furthermore a G-Y color-difference signal is obtained from the R-Y and B-Y color-difference signals via the matrix circuit.

The phase of a reference carrier wave for demodulation can be changed by the voltage which is supplied to the tint terminal. Therefore, by adjusting the voltage which is supplied to the tint terminal, the hue of a color-difference signal to be demodulated can be adjusted.

Such a color signal processor is on market as an integrated circuit. For example, it is on sale as Type HA11511CNT from Hitachi, Ltd., Japan.

Figure 7:
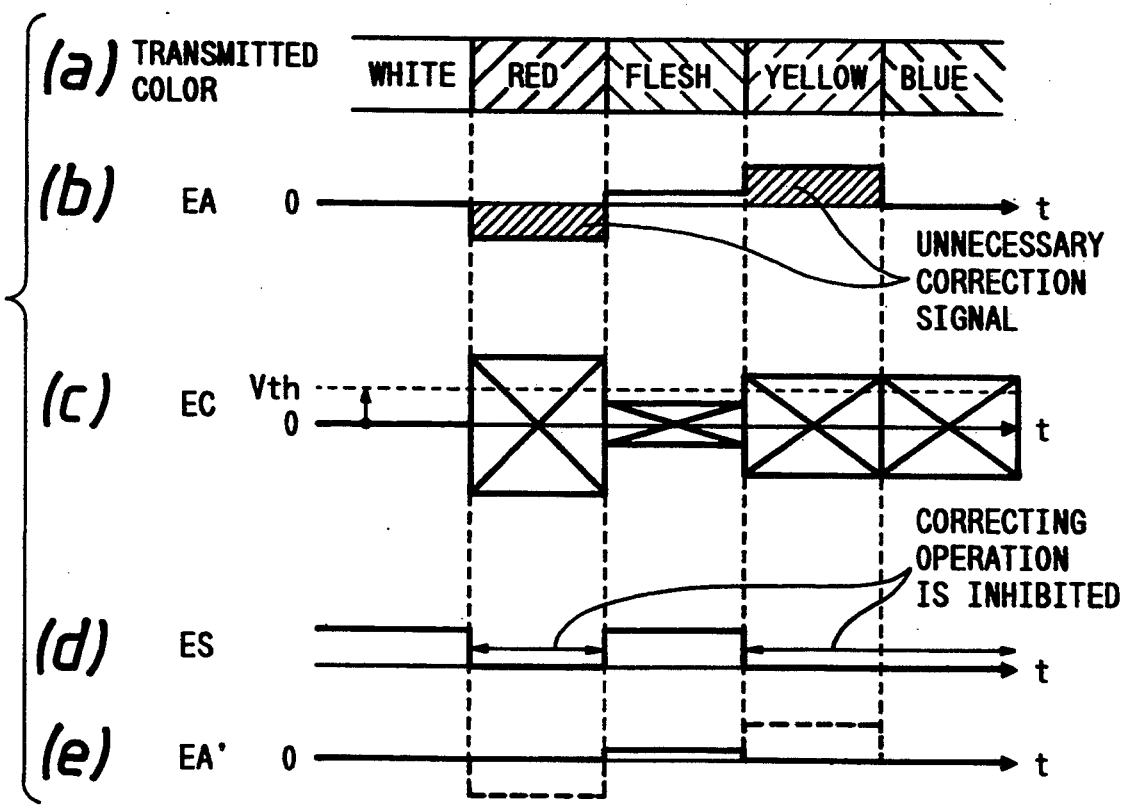
FIG. 7 is a waveform diagram for explaining the operation of the embodiment shown in FIG. 6.

Next, detailed operations of this embodiment will be explained. First, the flesh color correcting operation by tint control will be explained. The flesh color correction in this case is basically the same as that in FIG. 2. Namely, when the S-shaped characteristic shown in FIG. 2(a) is applied to the tint control terminal, the color phase neighboring the flesh color is changed and the hue becomes equivalent to that of the I-axis, so that the characteristic shown in FIG. 2(b) is obtained. Next, detailed operations of this embodiment will be explained with reference to FIG. 7. Since FIGS. 7(a) and 7(b) are the same as FIGS. 3(a) and 3(b), explanation will be omitted. FIG. 7(c) shows a characteristic of the color sub-carrier signal (EC) which is supplied to the level detector 102 and the level Vth of the predetermined voltage 5. Although the signal is shown as it is in this drawing, it is considered to be more desirable that the signal is actually subjected to envelope detection and compared with Vth. From this relationship, the red, yellow, and blue ranges can be specified. The output signal ES of the level detector 102 which is the result is shown in FIG. 7(d). When the gain of the gain controller 103 is controlled by this signal, the flesh color correcting operation within the red and yellow ranges is inhibited. Therefore, the correction signal EA' which is obtained as output of the gain controller 103 has the characteristic shown in FIG. 7(e). The correction signals which are unnecessary for red and yellow are removed like this and the problem that the hues of red and yellow are changed is improved. (Although the flesh color correcting operation within the blue range is inhibited also in this case in the same way as in FIG. 5, no waveform change appears in EA' because no correction signal exists in EA.)

As explained above, according to the present invention, although the conventional flesh color correction is made only by hue detection, the color discrimination accuracy is improved by adding color or luminance level detection, and the flesh color correction effect can be obtained by suppressing the degradation of reproduction of colors other than the flesh color.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:
   detecting an amplitude level of the R-Y color-difference signal; and
   controlling the gain of said flesh color correction signal according to the detected amplitude level of the R-Y color-difference signal.

2. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:
   detecting an amplitude level of the B-Y color-difference signal; and
   controlling the gain of said flesh color correction signal according to the detected amplitude level of the B-Y color-difference signal.

3. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:

detecting an amplitude level of the R-Y color-difference signal;

detecting an amplitude level of the B-Y color-difference signal;

adding the values of the detected amplitude levels of R-Y and B-Y color-difference signals; and controlling the gain of said flesh color correction signal according to the added result.

4. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:

detecting an amplitude level of the R-Y color-difference signal; and inhibiting correction of the B-Y color-difference signal by said flesh color correction signal when the detected amplitude level of the R-Y color-difference signal exceeds a predetermined value.

5. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:

detecting an amplitude level of the B-Y color-difference signal; and inhibiting correction of the B-Y color-difference signal by said flesh color correction signal when the detected amplitude level of the B-Y color-difference signal exceeds a predetermined value.

6. A method for correcting flesh color, including the steps of generating an I-axis component and Q-axis component of a color-difference signal from R-Y, G-Y, and B-Y color-difference signals; generating a flesh color correction signal on the basis of the generated I-axis and Q-axis components; and correcting the B-Y color-difference signal by the generated flesh color correction signal, said method comprising the steps of:

detecting an amplitude level of the R-Y color-difference signal;

detecting an amplitude level of the B-Y color-difference signal;

adding values of the detected R-Y and B-Y color-difference signals; and inhibiting correction of the B-Y color-difference signal by said flesh color correction signal when the added result exceeds a predetermined value.

7. A method for correcting flesh color, including the steps of generating an I-axis component and Q-axis component of a color signal from three primary color (R, G, B) signals; generating a flesh color correction signal on the basis of the generated I-axis and Q-axis components; and correcting the color signal by the generated flesh color correction signal, said method comprising the steps of:

detecting amplitude levels of at least one of the R and B color signals of said primary color signals; and controlling the gain of said flesh color correction signal according to the detected amplitude levels.

8. A method for correcting flesh color, including the steps of generating an I-axis component and Q-axis component of a color signal from the three primary color signals; generating a flesh color correction signal on the basis of the generated I-axis and Q-axis components; and correcting the color signal by the generated flesh color correction signal, said method comprising the steps of:

detecting amplitude levels of at least one of the R and B color signals of said primary color signals; and inhibiting correction of the color signal by said flesh color correction signal when the detected amplitude levels exceed a predetermined value.

9. An apparatus for correcting flesh color, comprising:

a correction signal generator for generating an I-axis component and a Q-axis component of a color-difference signal from R-Y, G-Y, and B-Y color-difference signals and generating a flesh color correction signal on the basis of the generated I-axis and Q-axis components;

a gain controller for controlling the level of the generated flesh color correction signal; and a detector for detecting an amplitude level of the R-Y color-difference signal;

wherein said gain controller controls the flesh color correction signal level in response to the output of said detector.

10. An apparatus for correcting flesh color, comprising:

a correction signal generator for generating an I-axis component and a Q-axis component of a color-difference signal from R-Y, G-Y, and B-Y color-difference signals and generating a flesh color correction signal on the basis of the generated I-axis and Q-axis components;

a gain controller for controlling the level of the generated flesh color correction signal; and a detector for detecting an amplitude level of the B-Y color-difference signal;

wherein said gain controller controls the flesh color correction signal level in response to the output of said detector.

11. An apparatus for correcting flesh color, comprising:

a correction signal generator for generating an I-axis component and Q-axis component of a color signal from three primary color (R, G, B) signals and generating a flesh color correction signal on the basis of the generated I-axis and Q-axis components;

a gain controller for controlling the level of the generated flesh color correction signal; and a detector for detecting amplitude levels of at least one of the R and B color signals of said primary color signals;

wherein said gain controller controls the flesh color correction signal level in response to the output of said detector.

* * * * *